US008028026B2

(12) United States Patent
Jain et al.

(10) Patent No.: US 8,028,026 B2
(45) Date of Patent: Sep. 27, 2011

(54) PERIMETER MESSAGE FILTERING WITH EXTRACTED USER-SPECIFIC PREFERENCES

(75) Inventors: Chandresh K. Jain, Sammamish, WA (US); Malcolm E. Pearson, Kirkland, WA (US); Nathan F. Waddoups, Redmond, WA (US); Mihai Costea, Redmond, WA (US); Eric D. Tribble, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 925 days.

(21) Appl. No.: 11/421,367

(22) Filed: May 31, 2006

(65) Prior Publication Data

US 2007/0282953 A1 Dec. 6, 2007

(51) Int. Cl.
   *G06F 15/16* (2006.01)
(52) U.S. Cl. ...................................................... 709/206
(58) Field of Classification Search .................... None
   See application file for complete search history.

(56) References Cited

U.S. PATENT DOCUMENTS

| | | | |
|---|---|---|---|
| 5,737,419 A | 4/1998 | Ganesan | |
| 5,872,930 A | 2/1999 | Masters et al. | |
| 6,138,159 A | 10/2000 | Phaal | |
| 6,208,720 B1 | 3/2001 | Curtis et al. | |
| 6,243,815 B1 * | 6/2001 | Antur et al. | 726/11 |
| 6,421,709 B1 * | 7/2002 | McCormick et al. | 709/206 |
| 6,678,828 B1 | 1/2004 | Zhang et al. | |
| 6,691,156 B1 | 2/2004 | Drummond et al. | |
| 6,704,772 B1 | 3/2004 | Ahmed et al. | |
| 6,760,420 B2 | 7/2004 | Heilmann et al. | |
| 6,779,021 B1 | 8/2004 | Bates et al. | |
| 6,816,970 B2 | 11/2004 | Morgan et al. | |
| 6,868,498 B1 * | 3/2005 | Katsikas | 726/14 |
| 6,931,532 B1 | 8/2005 | Davis et al. | |
| 6,941,459 B1 | 9/2005 | Hind et al. | |
| 6,961,849 B1 | 11/2005 | Davis et al. | |
| 6,978,367 B1 | 12/2005 | Hind et al. | |
| 7,007,067 B1 | 2/2006 | Azvine et al. | |
| 7,051,064 B1 * | 5/2006 | Yamagishi et al. | 709/200 |
| 7,134,137 B2 * | 11/2006 | Joshi et al. | 726/1 |

(Continued)

FOREIGN PATENT DOCUMENTS

CA    2 390 817 A1    12/2003

(Continued)

OTHER PUBLICATIONS

Astaro Internet Secutiry, Astaro All-in-One Security: Spam Protection, http://www.astaro.com/firewall_network_security/anti_spam_filter, 2006, 4 pp., Astaro Corporation.

(Continued)

*Primary Examiner* — Krista M Zele
*Assistant Examiner* — Matthew S Lindsey
(74) *Attorney, Agent, or Firm* — Senniger Powers LLP (57) ABSTRACT

Propagating messaging preferences of one or more users from a recipient mailbox to a perimeter network administering e-mail content blocking and routing. A content filtering application located outside a trusted network receives messaging preferences information from within the trusted network regarding the mail recipients. This messaging preferences information may be utilized to allow certain preauthorized messages from particular senders to bypass content filtering. Moreover, the messaging preferences information may be hashed to further protect the information on the perimeter network and to speed in review and comparison of the messaging preferences information. In addition, other types of user-specific information may be propagated to the perimeter network for use with other applications other than messaging.

13 Claims, 4 Drawing Sheets

U.S. PATENT DOCUMENTS

| | | |
|---|---|---|
| 7,155,723 B2 | 12/2006 | Swildens et al. |
| 7,181,017 B1 | 2/2007 | Nagel et al. |
| 7,188,358 B1 | 3/2007 | Hisada et al. |
| 7,191,252 B2 | 3/2007 | Redlich et al. |
| 7,206,814 B2 | 4/2007 | Kirsch |
| 7,299,261 B1 | 11/2007 | Oliver et al. |
| 7,340,438 B2 | 3/2008 | Nordman et al. |
| 7,395,314 B2 | 7/2008 | Smith et al. |
| 7,466,694 B2 | 12/2008 | Xu et al. |
| 7,496,628 B2 | 2/2009 | Arnold et al. |
| 7,516,182 B2 | 4/2009 | Goldman |
| 7,522,908 B2 | 4/2009 | Hrastar |
| 7,546,348 B2 | 6/2009 | Wilson et al. |
| 7,571,220 B1 | 8/2009 | Ng |
| 7,590,736 B2 | 9/2009 | Hydrie et al. |
| 7,613,659 B1 | 11/2009 | Hoffman et al. |
| 2001/0032245 A1 | 10/2001 | Fodor |
| 2002/0048369 A1 | 4/2002 | Ginter et al. |
| 2002/0078351 A1 | 6/2002 | Garib |
| 2002/0099823 A1 | 7/2002 | Jemes et al. |
| 2002/0120711 A1 | 8/2002 | Bantz et al. |
| 2003/0009385 A1 | 1/2003 | Tucciarone et al. |
| 2003/0028580 A1 | 2/2003 | Kucherawy |
| 2003/0050911 A1 | 3/2003 | Lucovsky et al. |
| 2003/0059030 A1 | 3/2003 | Tenorio |
| 2003/0149888 A1 | 8/2003 | Yadav |
| 2003/0163540 A1 | 8/2003 | Dorricott |
| 2003/0191969 A1 | 10/2003 | Katsikas |
| 2003/0196116 A1* | 10/2003 | Troutman ............ 713/201 |
| 2004/0039786 A1 | 2/2004 | Horvitz et al. |
| 2004/0059789 A1 | 3/2004 | Shum |
| 2004/0073617 A1* | 4/2004 | Milliken et al. ............ 709/206 |
| 2004/0087311 A1 | 5/2004 | Haglund |
| 2004/0109518 A1 | 6/2004 | Miller et al. |
| 2004/0143635 A1 | 7/2004 | Galea |
| 2004/0162880 A1 | 8/2004 | Arnone et al. |
| 2004/0177120 A1* | 9/2004 | Kirsch ............ 709/206 |
| 2004/0243699 A1 | 12/2004 | Koclanes et al. |
| 2004/0249895 A1 | 12/2004 | Way |
| 2004/0255122 A1 | 12/2004 | Ingerman et al. |
| 2004/0260778 A1 | 12/2004 | Banister et al. |
| 2005/0015456 A1 | 1/2005 | Martinson, Jr. |
| 2005/0033810 A1 | 2/2005 | Malcolm |
| 2005/0055578 A1 | 3/2005 | Wright et al. |
| 2005/0080642 A1 | 4/2005 | Daniell |
| 2005/0080855 A1 | 4/2005 | Murray |
| 2005/0080864 A1* | 4/2005 | Daniell ............ 709/206 |
| 2005/0091320 A1 | 4/2005 | Kirsch et al. |
| 2005/0091323 A1 | 4/2005 | Smith et al. |
| 2005/0097170 A1* | 5/2005 | Zhu et al. ............ 709/204 |
| 2005/0097321 A1 | 5/2005 | Zhu et al. |
| 2005/0149479 A1* | 7/2005 | Richardson et al. ............ 707/1 |
| 2005/0177637 A1* | 8/2005 | Heron et al. ............ 709/227 |
| 2005/0198159 A1 | 9/2005 | Kirsch |
| 2005/0228867 A1 | 10/2005 | Osborne et al. |
| 2005/0278620 A1 | 12/2005 | Baldwin et al. |
| 2006/0036701 A1 | 2/2006 | Bulfer et al. |
| 2006/0041761 A1 | 2/2006 | Neumann et al. |
| 2006/0041936 A1* | 2/2006 | Anderson et al. ............ 726/11 |
| 2006/0053262 A1 | 3/2006 | Prahlad et al. |
| 2006/0053263 A1 | 3/2006 | Prahlad et al. |
| 2006/0095569 A1 | 5/2006 | O'Sullivan |
| 2006/0106938 A1 | 5/2006 | Dini et al. |
| 2006/0182034 A1 | 8/2006 | Klinker et al. |
| 2006/0253597 A1 | 11/2006 | Mujica |
| 2007/0055789 A1 | 3/2007 | Claise et al. |
| 2007/0088822 A1 | 4/2007 | Coile et al. |
| 2007/0100701 A1 | 5/2007 | Boccon-Gibod et al. |
| 2007/0168430 A1 | 7/2007 | Brun et al. |
| 2007/0177731 A1 | 8/2007 | Spies et al. |
| 2007/0206762 A1 | 9/2007 | Chandra et al. |
| 2008/0060080 A1 | 3/2008 | Lim |
| 2010/0121932 A1 | 5/2010 | Joshi et al. |

FOREIGN PATENT DOCUMENTS

| | | |
|---|---|---|
| EP | 1 143 665 A2 | 10/2001 |
| EP | 1143665 B1 | 10/2001 |
| WO | 00/07355 A2 | 2/2000 |
| WO | 0127772 A1 | 4/2001 |
| WO | 0225464 A1 | 3/2002 |

OTHER PUBLICATIONS

Lowther, Brandon, Securing an Infrastructure with Windows 2000 and Active Directory http://www.giac.org/certified_professionals/practicals/gcwn/0236.php, Apr. 8, 2002, 41 pp., SANS Institute 2003.

Norman ASA, Norman Spam Control 8 Manual, http://wwwdownload.norman.no/manuals/eng/nsc_en.pdf, May 14, 2003, 81 pp., Norman ASA Europe and United States.

Cuervo, F. et al., "Prime Time for Policy-Based Management", Alcatel Telecommunications Review, Alcatel, Paris Cedex, FR, Jul. 2003, XP007005947, ISSN: 1267-7167, 9 pgs.

Sun Microsystems, Chapter 5 Deployment Design, Online, Feb. 2005, Retrieved Jul. 2009, http:// web.archive.org/web20050219003745/http://docs.sun.com/source/819-0058/dep_archetect.html, pp. 1-22.

* cited by examiner

PERIMETER MESSAGE FILTERING WITH EXTRACTED USER-SPECIFIC PREFERENCES

Large networks are often organized to enhance security from outside attack. A common architecture for such a network includes a perimeter network, or DMZ (i.e., demilitarized zone), that surrounds a trusted network and acts as a buffer between the trusted network and the broader (e.g., global) computing network. These perimeter networks are utilized as a first line of defense against attack from entities residing in the broader network. As a first line of defense, devices and data stored upon the perimeter network are assumed to be at greater risk of attack. Thus, network designers carefully consider what data is placed on devices residing in such perimeter networks. For example, a common task for servers placed on a perimeter network is the routing of e-mails to users within the trusted network. To perform such routing functions, these servers require some information related to the users on the trusted network. Such data is readily available on the trusted network, such as through a distributed directory service containing configuration information (e.g., Microsoft Windows® Active Directory for Windows Server 2003). But because of the increased vulnerability of the perimeter network servers to attack, it is advantageous to limit the quantity and type of data replicated from the distributed directory service on the trusted network and placed upon the perimeter network servers. For the e-mail routing example, e-mail addresses may be stored on servers in the perimeter network, while other information about users is stored on the distributed directory service of the trusted network. Even so, storing e-mail addresses on the perimeter poses some risk of exposing the e-mail addresses of users within the trusted network. Obviously, exposure of such e-mail addresses outside the trusted network is not desirable. Thus, a method for further securing or otherwise protecting message routing information stored in the perimeter network would be beneficial.

In addition to protecting routing information stored in the perimeter network, the perimeter network is also responsible for blocking undesirable e-mails received at the perimeter network before they are delivered to users within the trusted network. Conventionally, this blocking of such undesirable e-mails is accomplished by means of a content filtering application, such as a spam blocker. Although such spam blockers are relatively effective at blocking undesirable e-mails based upon content, such gross filters also block some desirable e-mail by incorrectly categorizing the e-mail as undesirable. For example, a desirable e-mail about a patient prescription may be blocked at the perimeter where the content filtering application determines that the e-mail is an unsolicited offer to sell medication without a prescription (the term of art is "false positive"). If false positives are occurring too often, a system administrator may relax the global content filtering application acting at the perimeter to allow more e-mails to pass through to the users on the trusted network. Although such a change lessens the problems associated with false positives, it also allows more undesirable e-mail to pass through to users, who now will likely receive more undesirable e-mails.

With perimeter controls somewhat relaxed to reduce false positives for preferred e-mails, user-controlled messaging applications (e.g., Microsoft® Office Outlook® 2003), have options for binning messages to quarantine suspected junk mail, or spam. In particular, these mechanisms are designed to reduce the number of undesirable e-mails and increase the number of desirable e-mails received in a user's mailbox. For example, a messaging application operating on the client computer may administer a user-directed content filter, whereby messages from senders identified as safe are automatically delivered, without content filtering. In this manner, the client computer can bypass the local content filter for messages of known origin, while filtering messages from unknown senders for content. These user-directed content filters are useful for sorting messaging at the client computer, but projecting such information to the perimeter would be helpful because both local content filtering and perimeter content filtering could be avoided. Thus, a method for further utilizing user-specific content filtering criteria at the content filtering application located on the perimeter would be beneficial.

More generally, the above-noted operation of moving user-specific messaging information to a perimeter application may be utilized for other applications. Many applications executed on the perimeter for the benefit of users within a trusted network may work more effectively with user information from within the trusted network. Thus, a method for extracting user-specific information from the trusted network for secure use with an application executed on the perimeter network would be useful. Such user-specific information may include webpage links, recipient public keys to facilitate desktop to desktop security, and recipient information subsets (e.g., subsets of e-mail addresses, subsets of data, etc.) that may be shared with other organizations, among others.

SUMMARY

The following simplified summary provides a basic overview of some aspects of the present technology. This summary is not an extensive overview. It is not intended to identify key or critical elements or to delineate the scope of this technology. This Summary is not intended to be used as an aid in determining the scope of the claimed subject matter. Its purpose is to present some simplified concepts related to the technology before the more detailed description presented below.

Accordingly, aspects of embodiments of the invention provide for protecting message routing information stored in the perimeter network. Aspects of embodiments of the invention permit the use of user-specific content filtering criteria for messaging filtering at the perimeter of a system. In addition, by allowing extraction of user-specific information from the trusted network, aspects of embodiments of the invention permit the use of such user-specific information on the perimeter for use with other applications.

BRIEF DESCRIPTION OF THE DRAWINGS

Corresponding reference characters indicate corresponding parts throughout the drawings.

DETAILED DESCRIPTION

Figure 1:
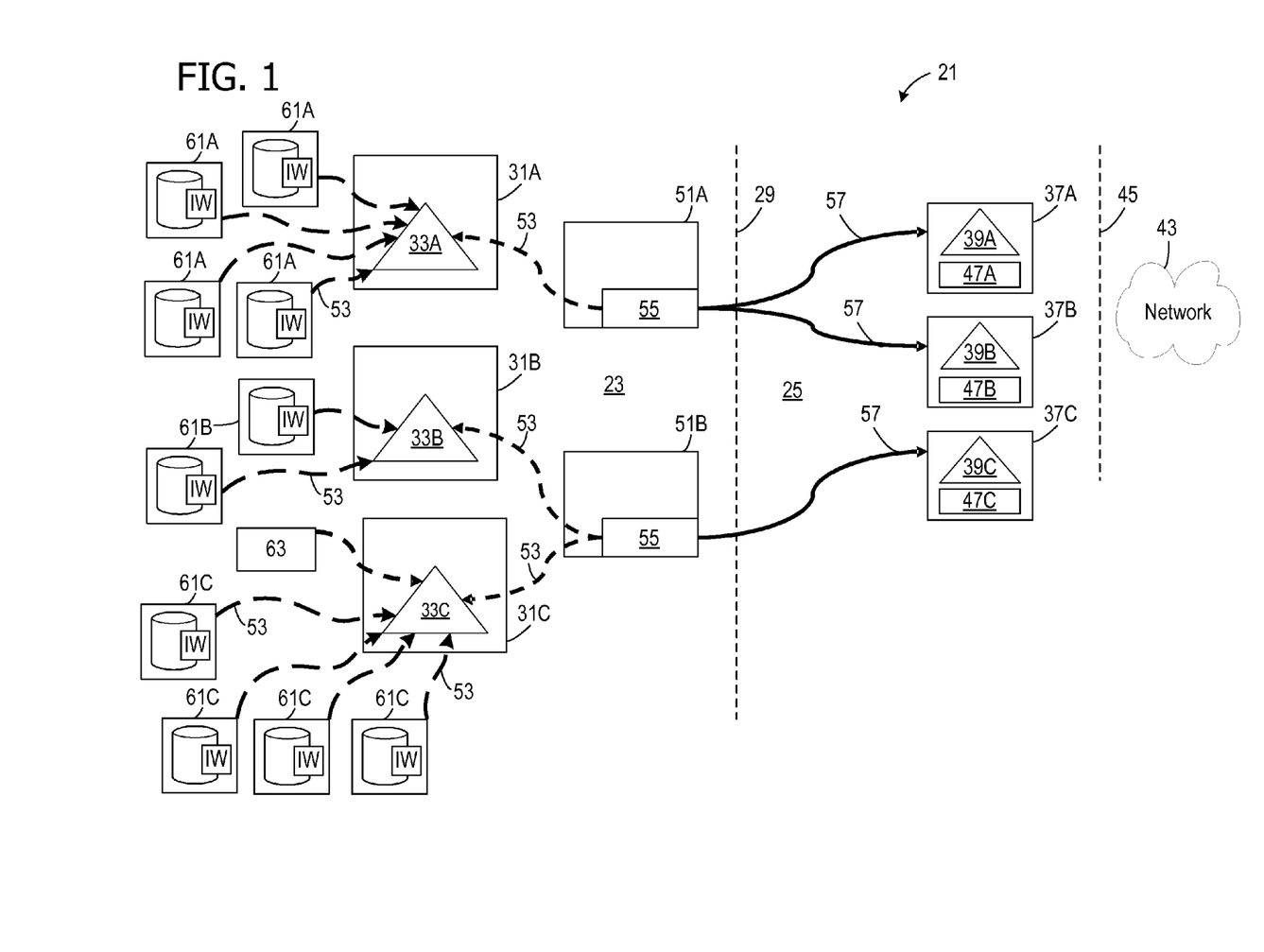
FIG. 1 is a diagram of a system of one embodiment of the invention.

Referring now to FIG. 1, a system, generally indicated 21, for establishing secure, mutually authenticated communication between a trusted network 23 and a perimeter network 25 outside the trusted network. The trusted network 23 exists, for example, behind an interior firewall 29 separating the perimeter network 25 and the trusted network 23. In one exemplary embodiment, the trusted network 23 is a corporate network, and the perimeter network 25 is a DMZ, protecting the corporate network from inappropriate external access.

The system 21 comprises one or more master servers 31, or domain controllers, residing in the trusted network 23. In the example of FIG. 1, three master servers, a first master server 31A, a second master server 31B, and a third master server 31C, are each adapted for administering a distributed directory service 33 containing configuration information related to the trusted network 23. Such configuration information can include system configuration data, recipient data, and/or routing data, among others. Each of the master servers 31A, 31B, and 31C is adapted for administering a first copy of the distributed directory service 33A, a second copy of the distributed directory service 33B, and a third copy of the distributed directory service 33C, respectively. Each distributed directory service 33A, 33B, and 33C contains the same configuration information related to the trusted network 23. In one example, the distributed directory service 33 is Microsoft Windows® Active Directory for Windows Server 2003, although the master servers may administer other alternative distributed directory services without departing from the scope of embodiments of the invention. When administering such a distributed directory service 33 on a trusted network 23, an administrator accessing any of the master servers 31 may add to, delete from, or modify the configuration information stored on the accessed master server. The distributed directory service 33 is responsible for updating the configuration information on the other master servers 31 according to the additions, deletions, or modifications resulting from the actions of the administrator. As would be readily understood by one skilled in the art, a greater or fewer number of master servers 31 may be utilized without departing from the scope of the present invention.

The system 21 also comprises one or more edge servers 37 residing in the perimeter network 25 outside the trusted network 23. In the example of FIG. 1, three edge servers, a first edge server 37A, a second edge server 37B, and a third edge server 37C, are each adapted for administering a stand-alone directory service 39. Each of the edge servers 31A, 31B, and 31B is adapted for administering a first copy of the stand-alone directory service 39A, a second copy of the stand-alone directory service 39B, and a third copy of the stand-alone directory service 39C, respectively. In one example, the stand-alone directory service 39 is Microsoft Active Directory Application Mode for Windows Server 2003, although the edge servers may administer other alternative stand-alone directory services without departing from the scope of embodiments of the invention. The one or more edge servers 37 are adapted for communicating with a network 43 (e.g., the Internet) outside the perimeter network 25. A fewer or greater number of edge servers 37 may be utilized without departing from the scope of the embodiments of the invention.

In the example shown, an exterior firewall 45 separates the one or more edge servers 37 residing in the perimeter network 25 from the network 43 outside the perimeter network. Moreover, each of the edge servers administers a content filtering application 47 for filtering incoming messaging from the network 43. An example of such a content filtering application 47 is a spam blocking application adapted for applying rules to block particular messages determined to be undesirable. The use of the term "spam" herein means an unsolicited message, such as an e-mail message, that is typically perceived as undesirable and burdensome to the recipient. As would be readily understood by one skilled in the art, other types of content filtering applications 47 beyond spam filters may also be utilized alone or in combination with other applications without departing from the scope of the present application. For example, an application applying a configuration information filter (e.g., message size limits) or a policy information filter (e.g., whether to archive content) may also be included. In the example shown, each of the edge servers 31A, 31B, and 31B is adapted for administering a first copy of the content filtering application 47A, a second copy of the content filtering application 47B, a third copy of the content filtering application 47C, respectively. Any of a variety of alternative firewall applications, alternative content filtering applications, and other additional or alternative security measures may be utilized without departing from the scope of the embodiments of the invention.

The system 21 further comprises one or more edge-connected bridgehead servers 51 residing in the trusted network 23 and adapted for communicating with the one or more master servers 31. Generally, edge-connected bridgehead servers 51 are responsible for routing messaging (e.g., e-mails) to appropriate mailbox servers (discussed below) and from the mailbox servers to the network 43 (e.g., the Internet) or the edge servers 37 of the perimeter network 25. The edge-connected bridgehead servers 51 communicate with the master servers 31 to obtain configuration information stored in the distributed directory service 33. In the example shown, the edge-connected bridgehead servers 51 utilize trusted network 23 secured LDAP 53 to communicate with the master servers 31, although other alternative protocols may be utilized without departing from the scope of embodiments of the invention. In the example shown, a first edge-connected bridgehead server 51A communicates with the first master server 31A, while the second edge-connected bridgehead server 51B communicates with the second master server 31B and the third master server 31C. As would be readily understood by one skilled in the art, an edge-connected bridgehead server 51 can communicate with one or more master servers 31 separately or in combination without departing from the scope of embodiments of the invention. Moreover, one skilled in the art will also recognize that one or more master servers 31 in the trusted network 23 may be assigned to function as bridgehead servers 51. In addition to communicating with the bridgehead servers 51, the master servers 31 are also adapted to act as mailbox servers for delivering messages to user mailboxes, as discussed below. Moreover, the bridgehead servers 51 can also function as master servers 31 if desired.

The edge-connected bridgehead servers 51 are adapted for replicating the configuration information from the distributed directory service 33 administered by the one or more master servers 31 within the trusted network 23 to the stand-alone directory service 39 administered by the one or more edge servers 37 within the perimeter network 25. The configuration information is replicated from the edge-connected bridgehead servers 51 to the edge servers 37 using internal firewall 29 secured LDAP 57, although other protocols may be utilized without departing from the scope of embodiments of the invention. Such configuration information includes any user/IW (information worker)-related information, including messaging preferences, as discussed in detail below with respect to methods embodied in the present invention.

In one example, the edge-connected bridgehead servers 51 execute a replication application 55 for performing such replication of configuration information to the stand-alone directory service 39 administered by the one or more edge servers 37. The replication application 55 can perform several functions, including (i) scheduling the interaction between the distributed directory service 33 on the master server 31 and the stand-alone directory service 39 on the edge server, (ii) replication of configuration information to the perimeter network 25 via LDAP, (iii) determining the topology of the components of the system 21, (iv) locking particular edge servers 37 from use, among others. Other alternative functions may also be performed without departing from the scope of embodiments of the invention. Moreover, in the example shown, the first edge-connected bridgehead server 51A communicates with both the first edge server 37A and the second edge server 37B, while the second edge-connected bridgehead server 51B communicates with the third edge server 37C. As would be readily understood by one skilled in the art, an edge-connected bridgehead server 51 can communicate with one or more edge servers 37 without departing from the scope of embodiments of the invention. Other alternative configurations are also contemplated.

The system 21 may also comprise other components. For example, the system 21 depicted in FIG. 1 includes exemplary client mailboxes 61 for use by IWs or users communicating with one of the master servers 31 acting as a mailbox server via trusted network 23 secured LDAP 53. As used herein, mailbox servers store messaging (e.g., e-mails, etc.), organize messaging folders, and maintain rules for individual users, among other functions. Each of the client mailboxes 61 is adapted to administer its own local messaging filter, such as via a messaging application (e.g., Microsoft® Office Outlook® 2003), for filtering e-mail messages at the local level. As shown in FIG. 1, each master server 31 acting as a mailbox server is adapted for transporting messages to several client mailboxes. For example, the first master server 31A transports messages to four client mailboxes 61A, the second master server 31B transports messages to two client mailboxes 61B, and the third master server 31B transports messages to four client mailboxes 61C. As discussed in greater detail below with respect to the embodied methods of the invention, such a local messaging filter includes user-directed messaging preferences for blocking and accepting e-mail messages from different senders.

In addition, the system 21 includes a bridgehead server 63 communicating with the third master server 31C to route mail within the trusted network 23, but not necessarily functioning as an edge-connected bridgehead server. Other alternative components may be utilized without departing from the scope of embodiments of the invention.

Figure 2:
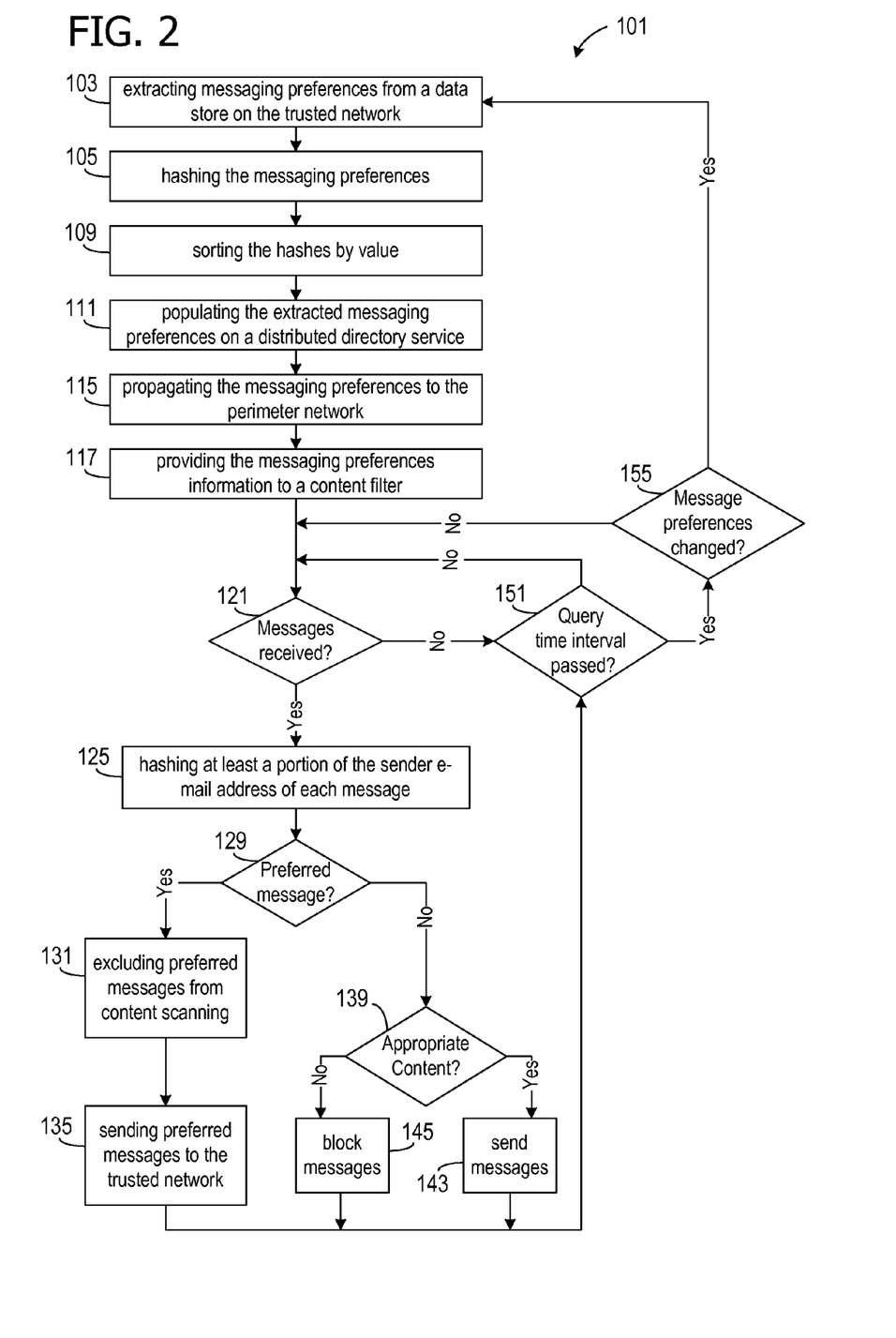
FIG. 2 is a flow diagram of a method of one embodiment of the invention.

An exemplary flow diagram, generally indicated at 101 in FIG. 2, illustrates aspects of a method for utilizing recipient-specific messaging preferences of messaging recipients utilizing client mailboxes 61 residing in the trusted network 23. In particular, but not limited to, the messaging preferences are utilized to bypass content filtering of preferred incoming messages corresponding to each of the recipients as they are received in the perimeter network 25 outside the trusted network 23.

Beginning at 103, aspects of the embodied invention extract messaging preferences from one or more data stores (e.g., individual recipient mailboxes 61) residing in the trusted network 23. More specifically, aspects of the embodied invention extract the messaging preferences from the user-controlled messaging application administered by the user. In one example, the extracting 103 messaging preferences comprises extracting at least one of sender addresses from a safe sender list, domain names from a safe domain list, and contact addresses from a contact list. In addition, the user may identify other safe senders, such as messages received from newsgroups, where the "from" identifier is not associated with a particular e-mail address or domain, but instead identifies a user group. Generally, any such messaging preference may be extracted 103 for use according to embodiments of the present invention. Each of these preferences can be administered by a user via the messaging application controlling the user's messaging. Other messaging preferences are also contemplated as within the scope of embodiments of the present invention. In another example, the extracting 103 messaging preferences comprises extracting electronic mail rules for sorting through received e-mail to identify potential junk e-mail. These rules may be similar to those used in the perimeter content filtering application, but again are user-specific and user-controlled. In this example, the electronic mail rules are stored at the recipient mailboxes 61, although they may be stored at another location, or another data store or stores, without departing from the scope of embodiments of the present invention. Moreover, as would be understood by one skilled in the art, the user-controlled messaging application retains its ability to filter incoming messages for content, even after its messaging preferences are extracted for use in the perimeter network 25. This retained functionality is useful because some user-controlled messaging applications may interact with mailbox servers on different systems, not all of which will extract information. Thus, the user-controlled messaging application can retain its ability to filter based upon message content. In another example, the extracting 103 can be scheduled periodically or can be invoked manually by the owner of the mailbox.

Continuing at 105, aspects of the embodied invention hash the extracted messaging preferences. As used herein, the term "hash" or "hashing" means to convert an identifier or key, sometimes in the form of a string (e.g., an e-mail address), into a unique, or relatively unique value using a carefully designed mathematical function. Such hashes can be of a fixed length and are converted in such a manner so as to uniquely identify the data associated with the identifier or key. Hashes can be one-way or two-way. Two-way hashes can be undone, while one-way hashes cannot. For example, suppose a hash algorithm was applied to the e-mail address "sallyjonessmith@xyzindustries.com," resulting in a hash value of 34872. If the hash was a two-way hash and the hash algorithm was known, the hash value of 34872 could be reconverted back to the e-mail address "sallyjonessmith@xyzindustries.com." For a one-way hash, however, the hash value of 34782 cannot be reconverted to find the e-mail address. Obviously, two-way hashes are useful for maintain the hash in a reversible state, while one-way hashes are beneficial for retaining the identification attributes of the hash, while not risking exposure of the identifier or key due to potential reverse engineering. In the present example, such one-way hashing can serve to retain the security of the messaging preferences, while allowing the hash to provide the identification function. In addition, because hashes can be smaller than the identifier or key hashed, hashing such messaging preferences of the present example reduces the size of such information, which makes storing the hashes and referencing/searching the hashes easier than storing or referencing/searching the messaging preferences themselves. In one example, the size of each hash is limited to four bytes.

According to embodiments of the present invention, the hashing 105 can occur at various locations within the system 21. In one example, the hashing 105 occurs at mailbox servers 31 servicing the multiple respective recipient mailboxes 61. In another example, the hashing 105 occurs at individual recipient mailboxes 61. The hashing 105 may occur at other locations within the trusted network 23 of the system 21 without departing from the scope of embodiments of the present invention.

In another example, the hashing 105 comprises a one-way hash, generally as set forth above. The one-way hash is not reversible. In other words, once the messaging preferences are hashed 105, the hash values cannot be reverse engineered by any means to determine the actual messaging preferences. One example of such a one-way hash is a Secure Hash Algorithm (SHA). As would be readily understood by one skilled in the art, other hashes may be utilized without departing from the scope of embodiments of the present invention. As would also be readily understood by one skilled in the art, an attacker may make a guess at both a messaging preference (e.g., a likely e-mail address) and a likely hash algorithm, hash the guess according to the algorithm, and check to see if the hash value appears in the hashed data. If it does, the attacker has likely verified that the guessed messaging preference is indeed a messaging preference, assuming the hash is not a false positive. Although such an attack technique can verify one or more messaging preferences, it is time-consuming and requires some knowledge to accurately guess the messaging preference and hash algorithm. Moreover, such a technique is not helpful for identifying messaging preferences not known to the attacker, which generally reduces its applicability and successfulness.

In one example of the hashing 105, at least two portions of at least one of the messaging preferences are hashed. For example, a messaging preference associated with "sallyjonessmith@xyzindustries.com" may be hashed in several different ways. First, the entire messaging preference associated with the e-mail address of "sallyjonessmith@xyzindustries.com" may be hashed 105. Comparing this hash with the hash of all e-mail senders for this user will identify any matching hashes associated with a message sender that exactly matches the address of sallyjonessmith@xyzindustries.com. In other words, hashing 105 the entire e-mail address provides a hash that may be utilized for determining exact e-mail address matches.

In a second example of hashing 105, only the username portion of the messaging preference preceding the at sign and the domain name (i.e., "sallyjonessmith") is hashed. Utilizing the username hash can identify any message that includes "sallyjonessmith" before the at sign and the domain name. Thus, messages from "sallyjonessmith@hotmail.com" and "sallyjonessmith@microsoft.com," for example, will hash as matches for a hash of "sallyjonessmith@xyzindustries.com." Such a hash may be useful for identifying messages from a particular user using the same e-mail username in combination with different e-mail domain names.

Third, the domain portion of the messaging preference (i.e., "xyzindustries.com") may also be hashed 105. Utilizing the domain hash can identify any message originating at the "xyzindustries.com" domain. Thus, messages from "johndoe@xyzindustries.com" and "janewalker@xyzindustries.com," for example, will hash as matches for a hash of "sallyjonessmith@xyzindustries.com." Such a hash may be useful for identifying messages from other users using the same e-mail domain as the user of the messaging preference. Although these three exemplary hashes may be used separately, they may also be utilized together, such that a single e-mail address has three hashes. In this manner exact matches, username matches, and e-mail domain matches may be gathered from a single e-mail address based upon a user's preference (e.g., choosing to add each of the e-mail address, the username of the e-mail address, and the domain of the e-mail address as a safe sender). Other partial hashes are also contemplated without departing from the scope of embodiments of the present invention.

Once the hashing 105 is complete, aspects of the embodied invention sort, at 109, the hashes by value for faster searching of the hashes. For example, a particular recipient's list of preferred, or safe, senders may include hundreds, or even thousands, of e-mail addresses. Once hashed 105, a lists or hundreds, or thousands, of hashes must be reviewed for potential matches with incoming messages. To facilitate this comparison, the list of hashes may be sorted, as comparison with a list of sorted data strings is more efficient that comparison with an unsorted list, as would be readily understood by one skilled in the art. As would be readily understood by one skilled in the art, embodiments of the present invention do not require such a sorting operation 109. Moreover, other optimizations, beyond sorting, are also contemplated as within the scope of embodiments of the present invention.

Proceeding to 111, aspects of the embodied invention populate the extracted messaging preferences on a distributed directory service 33 administered within the trusted network 23. This population 111 of information ensures that each of the master servers 31 administering the distributed directory service 33 has a copy of the extracted messaging preferences for individual users or recipients. Once the messaging preferences are populated to the distributed directory service 33, aspects of the embodied invention propagate, at 115, the messaging preferences to a stand-alone directory service 39 administered within the perimeter network 25, such as on one or more edge servers 37. In the example where the messaging preferences are hashed 105, the propagating 115 the messaging preferences comprises propagating hashed messaging preferences. Again, because the messaging preferences are hashed, propagating 115 those to the perimeter network 25 involves less risk of information exposure, because the hashes are one-way, and cannot be reverse engineered to render the messaging preferences prior to hashing.

The operations continue by providing, at 117, the messaging preferences information to a content filter 47 (i.e., a content filtering application) residing in the perimeter network 25, such as on one or more edge servers 37. The system 21 is now ready to utilize the propagated 115 messaging preferences to control the flow of messages from the edge servers 37 of the perimeter network 25 to the trusted network 23 recipient mailboxes 61.

Continuing to 121, the method 101 queries whether or not the system 21 has received any messages for routing to recipients within trusted network 23. Where the method 101 has received messages for routing, the method proceeds to 125, for hashing the sender e-mail address of any received messages. As discussed in detail above, the hashing can comprise hashing one or more of the entire e-mail address, the username of the e-mail address, and the domain of the e-mail address. The hashes of the messaging preferences of the intended recipient(s) of the messages and the sender e-mail addresses may then be compared to determine, at 129, if the message is a preferred message for one or more recipients. A preferred message is a message from a sender having a hash which matches the hash of a corresponding messaging preference, thereby indicating that the recipient has pre-authorized delivery of the message from the sender, or sender domain. Aspects of the embodied invention exclude, at 131, preferred messages identified by the messaging preferences from content scanning by the content filter. In one example, the excluding preferred messages comprises excluding messages from senders identified in the messaging preferences. At 135, aspects of the embodied invention send the preferred messages excluded from content scanning to the trusted network 23 for delivery to respective mailbox servers 31 servicing each respective recipient mailbox 61. As part of excluding 131, the message is marked as excluded from scanning, such that other content filters at other parts of the system 21 (e.g., the user messaging application) will also exclude the message. In other words, the interpretation of the hash which identified the message as a preferred message stays with the message at is moves through the system 21, thereby further eliminating content filtering where it is unnecessary.

In contrast, where a message is not preferred (i.e., no matching hash), aspects of the embodied invention filter, at 139, the non-preferred messages for appropriate content. This filtering 139 is a default action, whereby messages that are not pre-authorized by the recipient are filtered for content, rather than sent directly to the trusted network 23. Where the content of the message is determined to be appropriate, the method 101 proceeds to 143 sending messages with acceptable content to the trusted network 23. Conversely, where the content of the message is determined to be inappropriate, the method proceeds to 145, blocking messages with unacceptable content from reaching the trusted network 23, or at least badging the messages as potential spam. Other actions besides blocking 145 include deleting such messages, quarantining such messages, or refusing to accept the message on the perimeter network 25.

In the case of a message having multiple recipients, the logic proceeds as follows. If none of the recipients has a hash in their messaging preferences matching the sender hash (or domain or newsgroup hash), the content filtering application 47 filters 139 the message and sends 143 or blocks 145 the message as discussed in detail above. In contrast, if all of the recipients have a hash in their messaging preferences matching the sender hash, the preferred message is excluded 131 from content scanning and sent 135 to the trusted network 23. Finally, if some of the recipients have a hash match and other recipients do not, the content filtering application 47 filters 139 the message, but only applies the results of the filter to those recipients who do not have a hash match. The recipients with the hash match will receive the message without regard to the results of the filter.

In the above-noted example, a binary system bins messages as either preferred or not preferred. Preferred messages bypass all content filtering, for example, while not preferred messages are subject to full content filtering. As would be readily understood by one skilled in the art, a more complex system binning messages into more than two categories is also contemplated as within the scope of the embodiments of the present invention. For example, a third bin of conditionally-preferred messages may be subjected to partial filtering, instead of bypassing all filtering or being subject to the full filtering of the not preferred messages. Any number of other bins invoking any number of other rules, or outcomes, are also contemplated as within the scope of embodiments of the present invention.

Where the method 101 has not received 121 messages for routing or has sent 135, 143 or blocked 145 all of the received messages, the method proceeds to 151, for querying whether a time interval for checking for new messaging preferences has passed. Where the time interval has not passed, the method 101 returns to querying 121 whether any messages have been received, as set forth above. Where the time interval has passed, the method proceeds to 155, where aspects of the embodied invention query the recipient mailboxes 61 for determining if messaging preferences stored on the recipient mailboxes are different than those populated on the distributed directory service 33. The method 101 repeats at least the extracting 103, populating 111, propagating 115, and providing 117 operations (and in some examples the hashing 105 and sorting 103 operations) when it is determined that the messaging preferences of the recipient mailboxes 61 have changed. These operations allow the method 101 to update the messaging preferences when the user has made changes on his local messaging application. In one example, aspects of the embodied invention undertake such querying 155 at regular intervals, such as every 6 to 12 hours. Moreover, the method 101 can include a manual override, whereby an administrator can manually trigger the extracting 103, populating 111, propagating 115, and providing 117 operations, such that the messaging preferences are available on the perimeter network 25 immediately (e.g., in the event of power outages).

Figure 3:
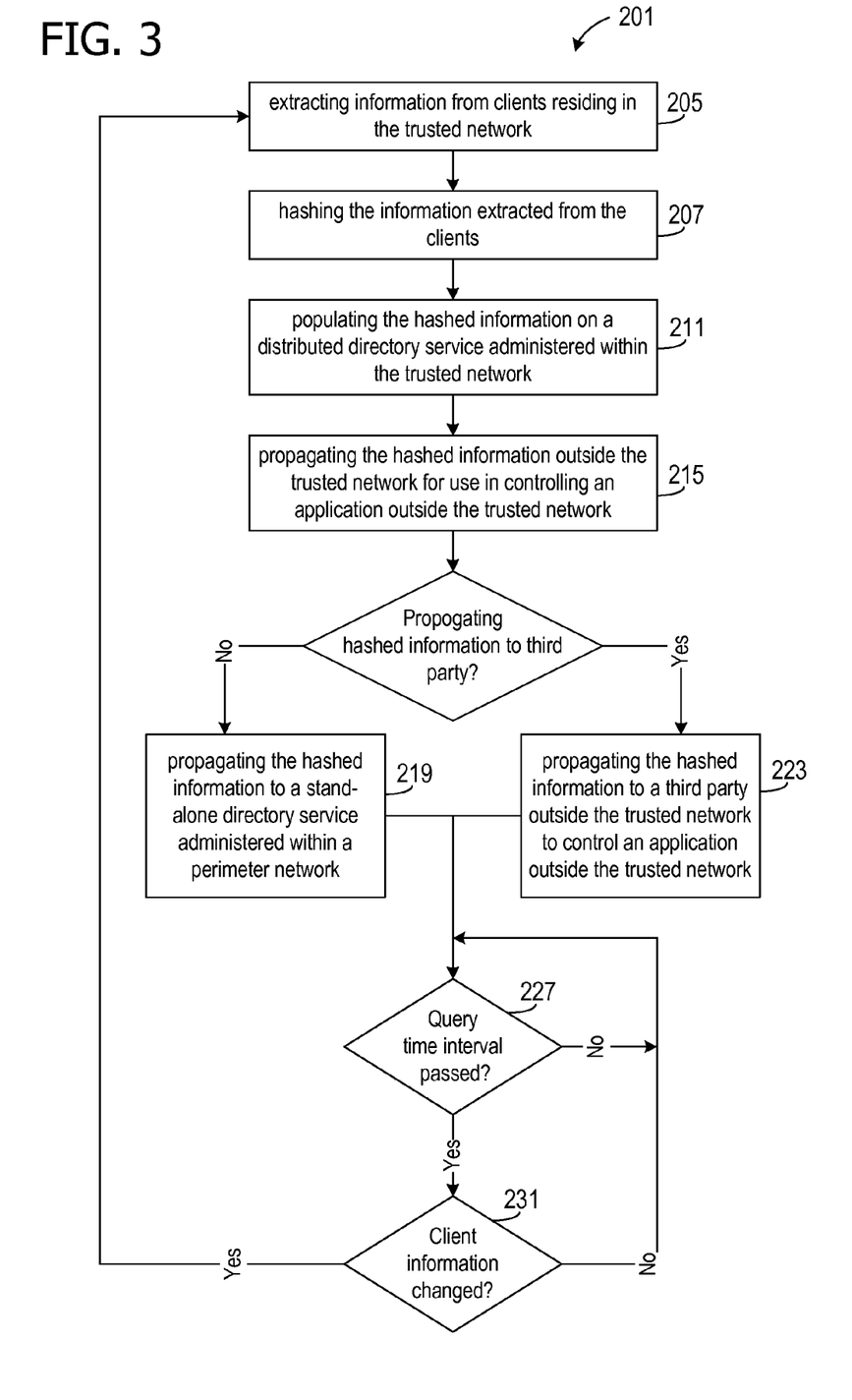
FIG. 3 is a flow diagram of another method of another embodiment of the invention.

Another exemplary flow diagram, generally indicated at 201 in FIG. 3, illustrates aspects of a method for securely transferring user information from a trusted network 23 for use in controlling an application outside the trusted network. Like the messaging example discussed above in great detail, other types of application executed in the perimeter network may also utilize data propagated from the trusted network. This data may be user-specific data, which may be hashed as discussed above.

Beginning at 205, aspects of the embodied invention extract information from users residing in the trusted network 23. This extraction 205 may be accomplished in any number of ways, including those discussed above in the context of messaging. Continuing at 207, aspects of the embodied invention hash the extracted user information. The hashing 207 has the same benefits as noted above in the messaging example.

Proceeding at 211, aspects of the embodied invention populate the hashed information on a distributed directory service 33 administered within the trusted network 23, generally as set forth above. At 215, aspects of the embodied invention propagate the hashed information outside the trusted network 23 for use in controlling an application outside the trusted network. At this point, the propagating 215 may proceed in two ways, internally and externally to the system 21. In one example, the propagating 215 the hashed information comprises propagating, at 219, the hashed information to a stand-alone directory service 39 administered within a perimeter network 25 outside the trusted network 23. In another example, the propagating 215 the hashed information comprises propagating 223 the hashed information to a third party outside the trusted network 23. Such a third party can be another company, a vendor, or another part of an organization adapted for utilizing the hashed information to control an application outside the trusted network 23. Such a third party transfer of information could be utilized where certain server functions were sought to be outsourced to another provider.

The method proceeds to 227, for querying whether a time interval for checking for new user information has passed. Where the time interval has not passed, the method 201 returns to querying 227 until the time interval passes. Where the time interval has passed, the method proceeds to 231, where aspects of the embodied invention query the users for determining if user information stored on the trusted network is different than those populated on the distributed directory service 33. The method 201 repeats the extracting 205, hashing 207, populating 211, and propagating 215 operations when it is determined that the user information has changed. These operations allow the method 201 to update the user information from the trusted network 23.

Figure 4:
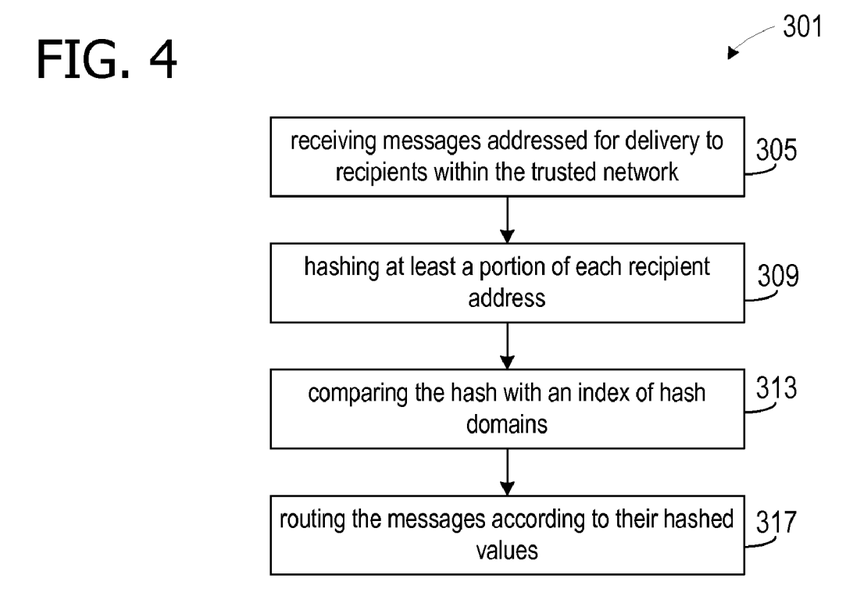
FIG. 4 is a flow diagram of still another method of still another embodiment of the invention.

Still another exemplary flow diagram, generally indicated at 301 in FIG. 4, illustrates aspects of a method for routing messages received by a server (e.g., an edge server 37) outside a trusted network 23. In the present example, the received messages are addressed for delivery within the trusted network 23, but the edge servers 37 in the perimeter network 25 must route the messages to the proper recipient.

Beginning at 305, aspects of the embodied invention receive messages addressed for delivery to recipients within the trusted network 23. These received messages can be directed to a number of different domains within the organization bounded by the system 21. For example, some messages may be sent to recipients a "microsoft.com" domain, while other messages may be directed to an "exchange.microsoft.com" domain.

Proceeding at 309, aspects of the embodied invention hash at least a portion of each recipient address. In one example, the hashing 309 at least a portion of each recipient address comprises hashing the domain name of each recipient address. With the hash of the domain name in hand, the method 301 continues at 313, wherein aspects of the embodied invention compare the hash with an index of hash domains. The index of hash domains includes hashes for each of the different domains within the system 21 (e.g., "microsoft.com," "exchange.microsoft.com," etc.). The hashes of the domains may then be readily compared with the hashes of the messages to sort those messages pertaining to one domain from all other domains. At 317, aspects of the embodied invention route the messages according to their hashed values. For example, all messages with hashes corresponding to e-mail addresses at "microsoft.com" may be sent directly to mailbox servers 31 servicing those recipients, while all messages with hashes corresponding to e-mail addresses at "exchange.microsoft.com" may be sent directly to other mailbox servers servicing those recipients. Because the e-mail domain is hashed, the sorting of such message is accomplished more quickly. In addition, placing the hashed values for e-mail domains on the perimeter network 25 preserves the security of the domains, since the actual domain names need not leave the trusted network 23.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A method for utilizing recipient-specific messaging preferences of messaging recipients residing in a trusted network to bypass content filtering of preferred incoming messages corresponding to each of the recipients as the messages are received in a perimeter network outside the trusted network, said method comprising:

extracting recipient-specific messaging preferences from one or more mailboxes associated with each of the message recipients residing in the trusted network, said trusted network being separated from the perimeter network by at least one interior firewall;

hashing at least two portions of at least one of the extracted recipient-specific messaging preferences using a hashing function;

populating the hashed recipient-specific messaging preferences into a distributed directory service administered on at least one server in the trusted network;

propagating the hashed recipient-specific messaging preferences from said distributed directory service to a stand-alone directory service administered on at least one edge server in the perimeter network via the interior firewall, said perimeter network being separate from and outside the trusted network, wherein the perimeter network and a network outside the perimeter network are separated by at least one outer firewall;

providing the hashed messaging preferences information from the stand-alone directory service to a content filter residing in the perimeter network;

excluding preferred messages identified by the provided hashed messaging preferences from content scanning by the content filter;

querying the one or more mailboxes associated with each of the messaging recipients to determine if recipient-specific messaging preferences stored in the stand-alone directory service are different than those populated on the distributed directory service; and repeating the extracting, populating, propagating, and providing when it is determined that the messaging preferences stored in the stand-alone directory service have changed.

2. A method as set forth in claim 1 further comprising sending the preferred messages excluded from content scanning to the trusted network for delivery to respective mailbox servers servicing each respective recipient.

3. A method as set forth in claim 1 further comprising filtering non-preferred messages for appropriate content.

4. A method as set forth in claim 1 wherein said extracting messaging preferences comprises extracting at least one of sender addresses from a safe sender list, domain names from a safe domain list, and contact addresses from a contact list.

5. A method as set forth in claim 1 wherein said extracting messaging preferences comprises extracting electronic mail rules for sorting through received e-mail to identify potential junk e-mail, said electronic mail rules stored at the one or more mailboxes residing in the trusted network.

6. A method as set forth in claim 1 further comprising hashing at least a portion of the sender information of any received message.

7. A method as set forth in claim 6 wherein said hashing occurs at mailbox servers servicing multiple respective recipients.

8. A method as set forth in claim 6 wherein said hashing occurs at individual recipient mailboxes.

9. A method as set forth in claim 6 wherein said excluding preferred messages identified by the messaging preferences comprises excluding messages whose sender hash matches a hash of the preferred messaging preferences of the intended recipient.

10. A method as set forth in claim 6 further comprising sorting the hashes by value for faster searching of the hashes.

11. A method as set forth in claim 1 wherein said querying is undertaken at regular intervals.

12. A method as set forth in claim 1 wherein said excluding preferred messages comprises excluding messages from senders identified in the messaging preferences.

13. A method for securely transferring user information from a trusted network of computing devices for use in controlling an application executing outside the trusted network of computing devices, said method comprising:
- extracting user-specific information from mailboxes associated with users residing in the trusted network of computing devices, said user-specific information including user-specific messaging preferences, said trusted network being separated from a perimeter network by at least one interior firewall;
- hashing at least two portions of the user-specific information extracted from the users using a hashing function;
- populating the hashed user-specific information into a distributed directory service administered on at least one server in the trusted network; and
- propagating the hashed user-specific information from said distributed directory service to a stand-alone directory service administered on at least one edge server in the perimeter network via the interior firewall said perimeter network being separate from and outside the trusted network, wherein the perimeter network and a network outside the perimeter network are separated by at least one outer firewall; and
- propagating the hashed information to a third party outside the trusted network, said third party adapted for utilizing the hashed user-specific information to control an application outside the trusted network.

* * * * *